US008272600B2

(12) United States Patent  
Copeland et al.

(10) Patent No.: US 8,272,600 B2  
(45) Date of Patent: Sep. 25, 2012

(54) KEYBOARD AND MOUSE SUPPORT

(75) Inventors: Stephan Copeland, Merion Station, PA (US); Derek Timm, Windsor, CA (US)

(73) Assignee: Workrite Ergonomics, Inc., Petaluma, CA (US)

( * ) Notice: Subject to any disclaimer, the term of this patent is extended or adjusted under 35 U.S.C. 154(b) by 189 days.

(21) Appl. No.: 12/478,075

(22) Filed: Jun. 4, 2009

(65) Prior Publication Data

US 2009/0301360 A1 Dec. 10, 2009

Related U.S. Application Data

(60) Provisional application No. 61/059,835, filed on Jun. 9, 2008.

(51) Int. Cl.  
*B43L 15/00* (2006.01)

(52) U.S. Cl. .......... 248/118.5; 248/118; 248/118.1; 248/316.01; 108/50.01; 108/90

(58) Field of Classification Search .......... 248/118, 248/918, 346.01, 118.1, 118.5; 108/50.01, 108/90  
See application file for complete search history.

(56) References Cited

U.S. PATENT DOCUMENTS

| 5,636,822 | A | * | 6/1997 | Hendershot et al. ..... 248/346.01 |
| 5,655,743 | A | | 8/1997 | Gillis |
| 5,730,408 | A | | 3/1998 | McAllister et al. |
| 5,746,403 | A | | 5/1998 | Ambrose et al. |
| 5,755,410 | A | | 5/1998 | Ambrose et al. |
| 5,967,479 | A | * | 10/1999 | Sweere et al. ........... 248/280.11 |
| 6,079,676 | A | * | 6/2000 | Hackett et al. ................. 248/118 |
| 6,086,034 | A | | 7/2000 | McAllister et al. |
| 6,279,859 | B2 | | 8/2001 | West et al. |
| 6,296,215 | B1 | | 10/2001 | McCoy et al. |
| 6,390,432 | B1 | * | 5/2002 | VanderHeide et al. .. 248/346.01 |
| 6,409,127 | B1 | | 6/2002 | Vanderheide et al. |
| 6,488,248 | B1 | * | 12/2002 | Watt et al. ................... 248/279.1 |
| 6,526,896 | B2 | | 3/2003 | Woronecki et al. |
| 6,631,687 | B2 | | 10/2003 | Knighton |
| 6,682,038 | B2 | | 1/2004 | Golynsky |
| 6,688,563 | B1 | | 2/2004 | Waxham et al. |
| 6,749,158 | B2 | | 6/2004 | Timm |
| 6,874,736 | B1 | | 4/2005 | Jones et al. |
| 6,903,924 | B1 | | 6/2005 | Tyner |
| 6,912,119 | B2 | | 6/2005 | Maloney |
| 7,331,556 | B1 | * | 2/2008 | Brennan ................... 248/346.01 |
| 7,455,270 | B2 | * | 11/2008 | Maloney et al. ........... 248/278.1 |
| 7,758,002 | B2 | | 7/2010 | Blackburn |
| 2001/0000616 | A1 | * | 5/2001 | West et al. .................... 248/118 |
| 2004/0179331 | A1 | | 9/2004 | Maloney |
| 2007/0170326 | A1 | | 7/2007 | Timm et al. |

FOREIGN PATENT DOCUMENTS

EP 1006686 A1 6/2000

* cited by examiner

*Primary Examiner* — Amy J Sterling  
(74) *Attorney, Agent, or Firm* — Tarolli, Sundheim, Covell & Tummino, LLP

(57) ABSTRACT

A keyboard support having a generally flat keyboard supporting surface and a track extending along an outer periphery of the keyboard support. A mouse support has a generally flat mouse supporting surface and is coupled to the keyboard support by a track follower that engages the track for movement along the track. A coupling arm engages the track follower and allows pivoting of the mouse support with respect to the keyboard support.

16 Claims, 11 Drawing Sheets

KEYBOARD AND MOUSE SUPPORT

CROSS REFERENCE TO RELATED APPLICATION

The present application claims priority from provisional U.S. patent application Ser. No. 61/059,835 filed on Jun. 9, 2008 to Copeland et al, the above-identified provisional patent application is incorporated herein by reference in its entirety for all purposes.

FIELD OF THE INVENTION

The present invention concerns a computer keyboard support having a movable extension that supports a data input device, such as a mouse, for controlling a cursor position on a computer viewing screen.

BACKGROUND ART

Computers and terminals typically allow data entry through an alphanumeric keyboard. Often such a keyboard rests on a level desktop surface which is the same as the surface that supports a computer base unit and a viewing monitor or screen. Especially when the user must work at the computer for long periods of time, it is important to be able to adjust the position and/or orientation of the keyboard. Built in tabs that form an integral part of the keyboard allows for limited tilt adjustment. To allow more flexibility in positioning a keyboard to suit a user's ergonomic requirements, however, the keyboard needs its own support.

Different types of keyboard supports are sold by Work-Rite Ergonomic Accessories, Inc., the assignee of the present invention. One such keyboard support is movably supported by a track and support mechanism that allows the keyboard to be moved out from under a user's desk and then stored beneath the desk when the keyboard is not in use. This keyboard support also allows the user to adjust both the angle and the height of the keyboard in relation to the user.

A common personal computer input device that has received wide acceptance is a two dimensional input control device commonly referred to as a "mouse." As the mouse is moved over a flat surface a roller that extends from a bottom of the mouse rotates and this rotation is translated into electrical signals that are transmitted to an interface of the personal computer. The movement of the mouse on the surface causes a corresponding movement of an arrow or other shaped cursor on the computer screen. By moving the arrow to point at a desired icon, function block, dialog box, or pull down menu, the user can actuate switches on the mouse to select or pick icons, or functions, actuate pull-down menus, select a block of text for editing, enter data, etc.

U.S. Pat. No. 5,655,743 to Gillis concerns a keyboard tray which is formed from two relatively shallow molded bodies united along a periphery to define a relatively flat, internal chamber through either of opposite side edges of the keyboard support or tray. A mouse tray can project outwardly of the internal chamber through either of opposite side edges of the keyboard support.

U.S. Pat. No. 6,749,158 to Timm, incorporated herein by reference, concerns a keyboard and mouse support for a personal computer. The keyboard and mouse support includes a keyboard support and a moveable mouse support. To accommodate the moveable mouse support, the keyboard support includes a support body having a through passage that passes through the support body and opens on opposite sides of the support body. The moveable support is slidably positioned in the through passage. The support body defines a support surface configured to accommodate an alphanumeric keyboard for inputting signals corresponding to alphanumeric symbols to the computer.

SUMMARY

The mouse or pointer device typically includes a roller or optical sensor that requires a generally flat surface for its support. Although the term "mouse" has become almost universally used for a moveable pointer input device, other terms such as "trackball" can be used interchangeably with the term "mouse."

The system includes a keyboard support having a generally flat keyboard supporting surface. A mouse support has a generally flat mouse supporting surface and is coupled to the keyboard support for pivoting movement so that the generally flat mouse supporting surface can be re-oriented with respect to the generally flat keyboard support surface.

One exemplary system has a track that extends along an outer periphery of the keyboard support. The mouse support engages the keyboard support through a coupling that can be positioned along an extent of the track on either side of the keyboard support and also positioned in front of the keyboard support for a user who prefers that position due to the frequent use of the mouse and a need to have the mouse readily accessible.

By rotating the coupling with respect to the keyboard support, the mouse support can be aligned in the same general plane as the keyboard support, it may be raised above the plane of the keyboard support or it may be lowered below the plane of the keyboard support.

These and other objects, advantages, and features of the exemplary embodiment of the invention are described in detail in conjunction with the accompanying drawings.

DETAILED DESCRIPTION

Figure 1:
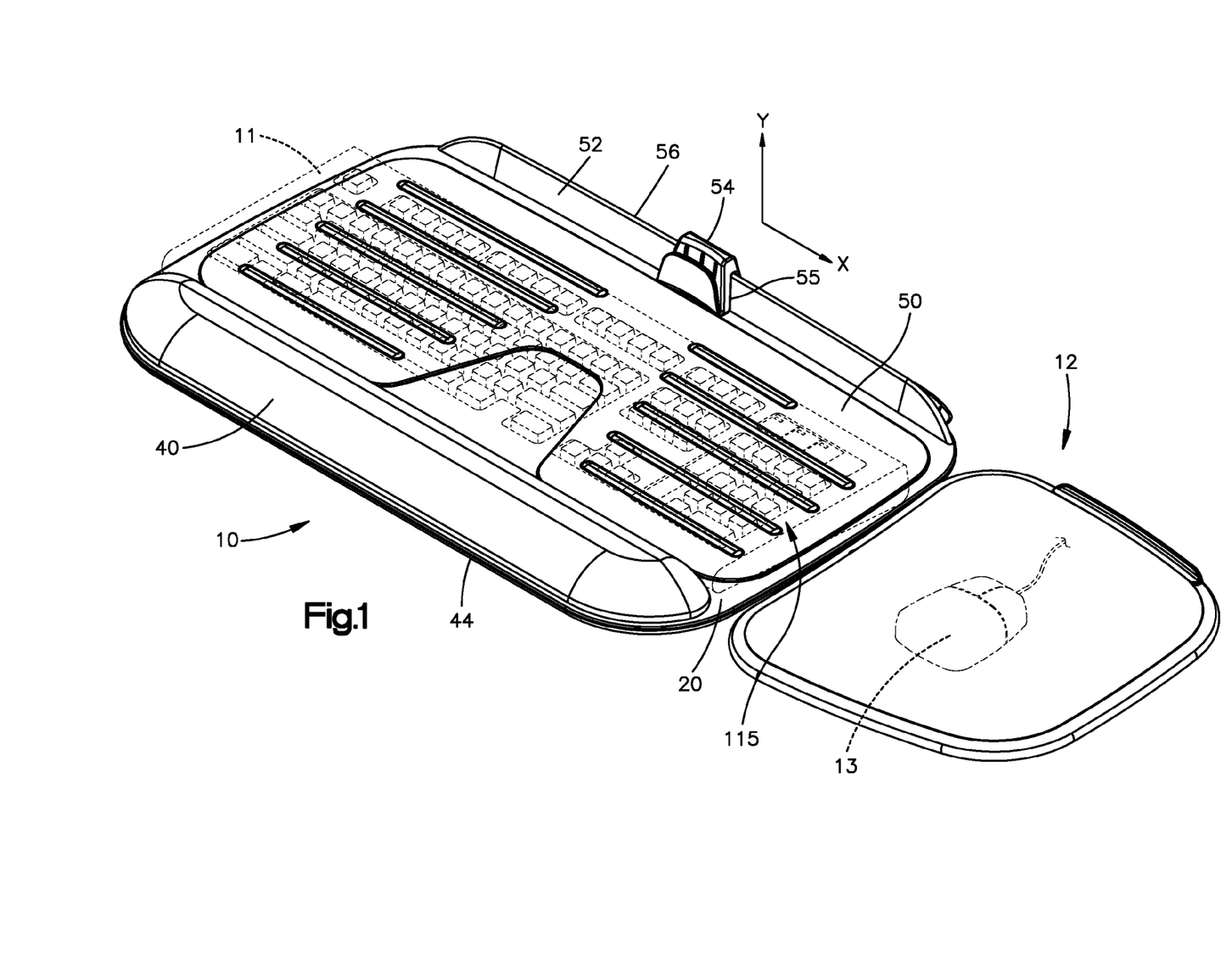
FIG. 1 is a perspective view of a first preferred embodiment of a keyboard and mouse support of the present invention.

FIG. 1 is a perspective view of a keyboard support 10 that supports a keyboard 11 in position for typing by a user at a computer work station. A moveable mouse support 12 is coupled to the keyboard support and supports a moveable pointer input device or mouse 13. Co-ordinated movement of the mouse 13 and mouse button actuation allows the user to provide control commands to the computer in a well known manner. The keyboard support 10 positions the keyboard and the mouse relative a computer (not shown) to which the keyboard and mouse are connected. The computer may rest on a desk (not shown) or on the floor in close proximity to a desk which provides a working surface for a user. The keyboard support 10 is typically mounted to a base that has a retractable support arm which extends out from beneath the desk and allows the user to adjustably position the height of the keyboard support 10 relative to the desk. United States published patent application number 2007/0170326 entitled "Height and Tilt adjustable keyboard support" illustrates one such keyboard support arm. The contents of this published patent application which is assigned to the assignee of the present invention are incorporated herein by reference.

Figure 2:
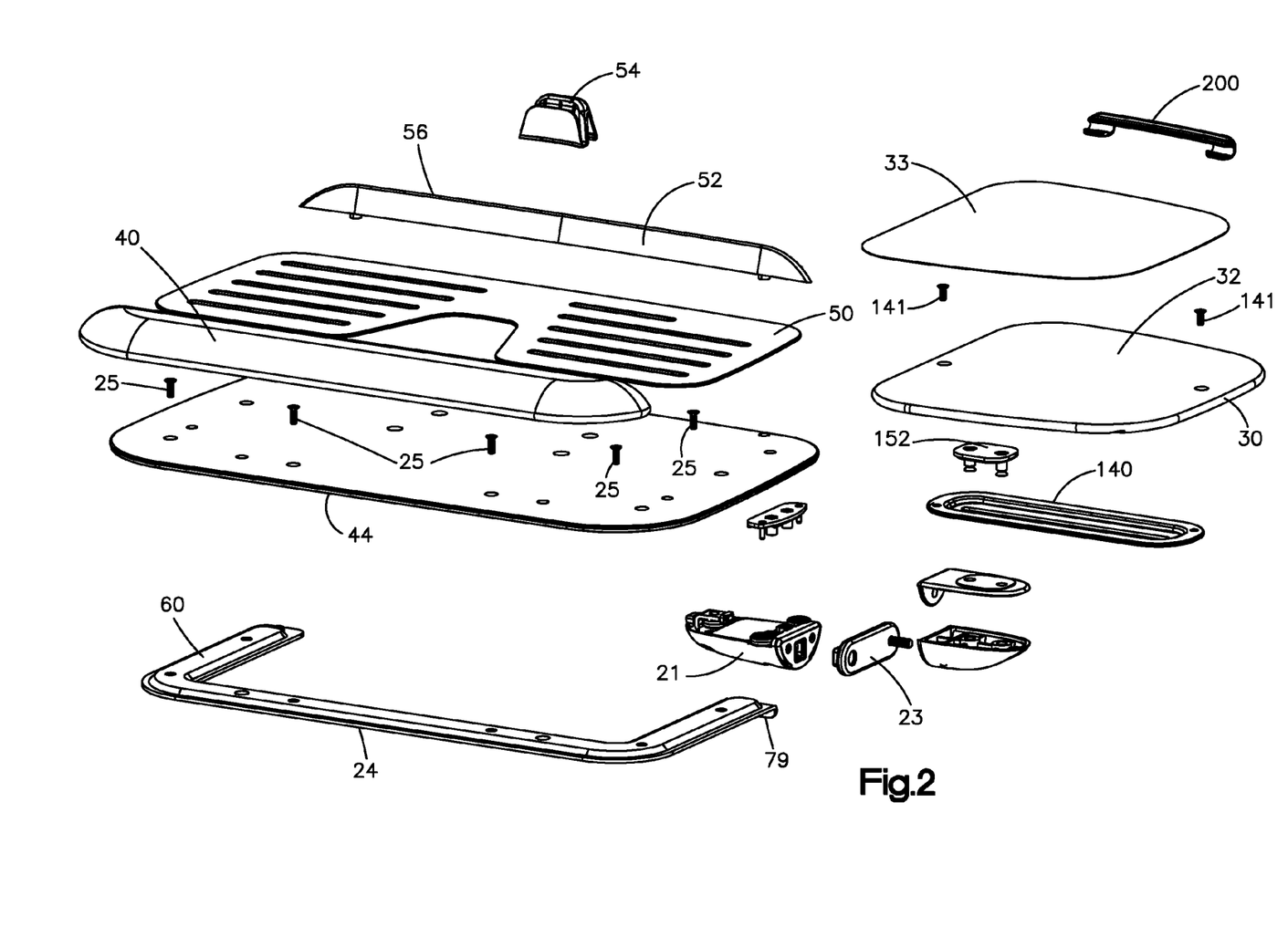
FIG. 2 is an exploded perspective view of the keyboard and mouse support of FIG. 1.

The keyboard support 10 includes a keyboard support platform 20 having a bottom surface that attaches to a support arm (not shown) and has a generally flat top support surface (FIG. 2). The Exemplary system has a keyboard coupler 21 and a mouse coupler 22 connected by a swing arm 23 for re-orienting the mouse support with respect to the keyboard support. One embodiment of the system has a generally U shaped track 24 that attaches to the platform 20 by means of connectors 25 which extend through the platform and engage threaded openings in the track. The track defines a peripheral travel path for the mouse support 12. The track 24 extends around the outer periphery of the platform 20 and in the illustrated embodiment is attached to an underside 35 (FIG. 4) of the platform.

The mouse support 12 includes a mouse platform 30 having a generally flat top surface 32 that supports a mouse contact surface 33. The mouse support platform 30 engages the keyboard support by means of the swing arm 23 and the two couplers 21, 22 that allow the mouse support to be re-positioned with respect to the keyboard support. As depicted in FIG. 1, the mouse support extends outwardly to the right of the keyboard support platform 20 and is generally co-planar with that platform (in the x-z plane). In the exemplary embodiment, the contact surface is a flat polyvinylchloride (PVC) sheet having a self adhesive material on one side, which is pressed onto the mouse platform 30.

Figure 6:
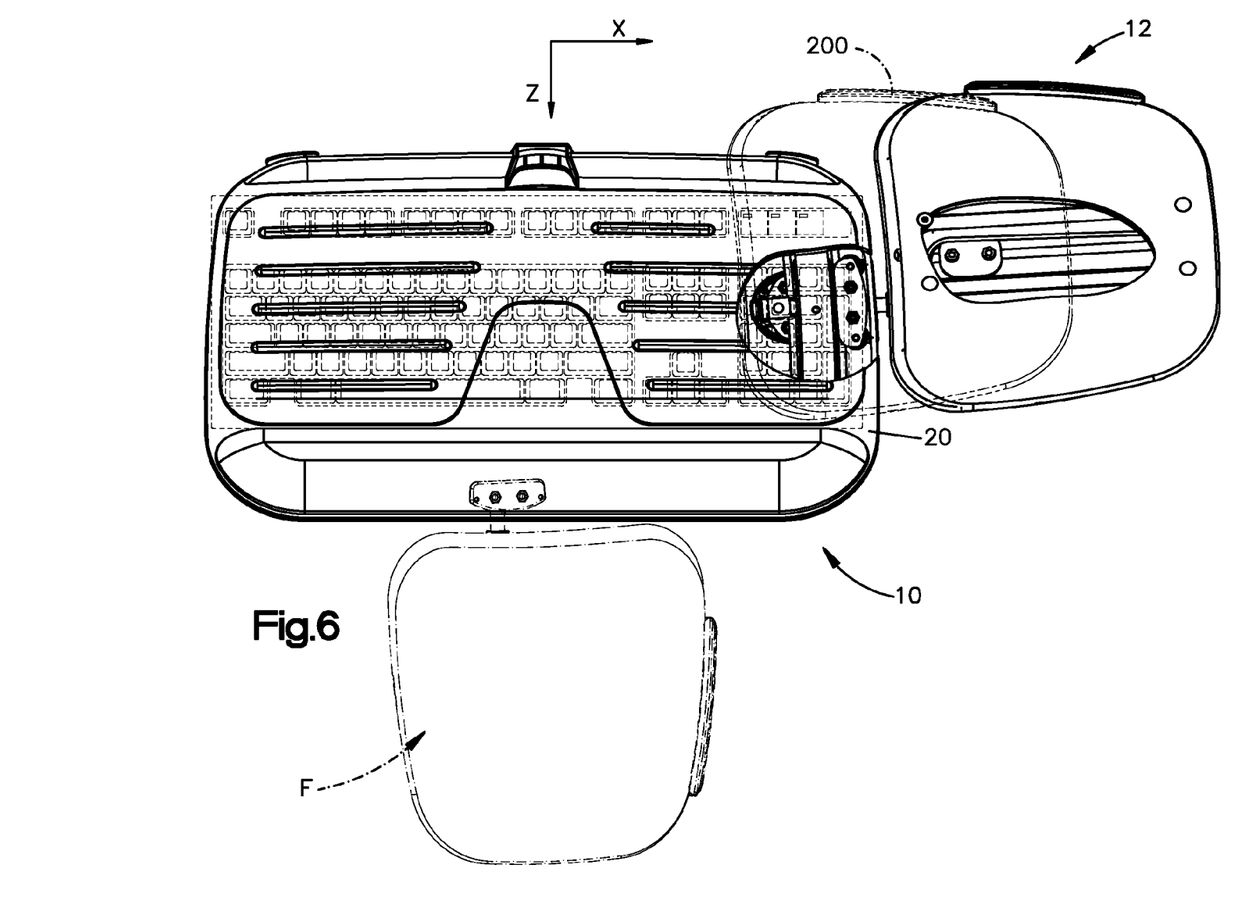
FIG. 6 is a top plan view of the combination of keyboard and mouse support with a portion of the keyboard support cut away.

The U-shaped track 24 extends along an edge closest to the mouse support depicted in FIG. 1, across the front and continues around to the left side of the keyboard support. The mouse support platform 30 may also be moved to the left side or spaced from a front edge 44 of the keyboard support platform 20 such that a portion of the mouse support 30 extends to the left of the platform 20 for use by a left-handed user or in a mouse forward position F (FIG. 6) for users that prefer to position the mouse in front of the keyboard as they manipulate the mouse and type on the keyboard.

A wrist support or pad 40 extends above the platform supporting surface and is attached to the keyboard support platform 20 adjacent a front edge 44 of the keyboard support platform 20. The wrist support 40 contacts a user's wrist as the user types at the keyboard 11. The wrist support 40 has a resilient foam confined within a plastic case or covering. A pliable keyboard mat 50 rests on top of the platform 20. In one embodiment, the position of the mat 50 is adjustable and in a second embodiment, the mat 50 is secured to the platform 20. A keyboard backstop 52 is attached to the platform and provides a limit for movement of the keyboard during use. A removable document holder 54 has a slot or notch 55 that fits over an elongated edge 56 of the backstop 52 and can be re-positioned by the user along a width of the keyboard support.

Figure 3A:
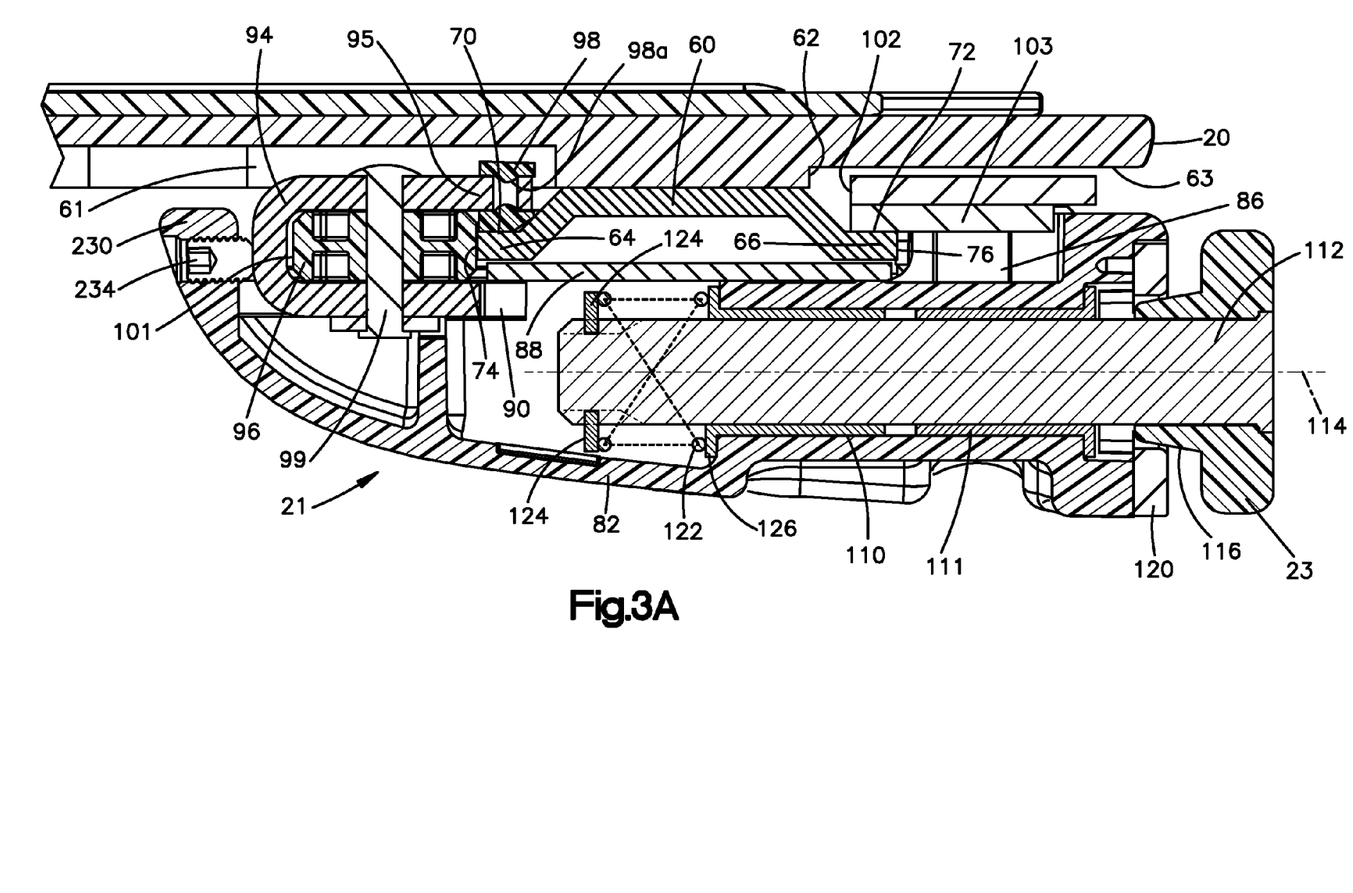
FIGS. 3A and 3B are section views depicting details of a coupling between a mouse support and a keyboard support.
Figure 4:
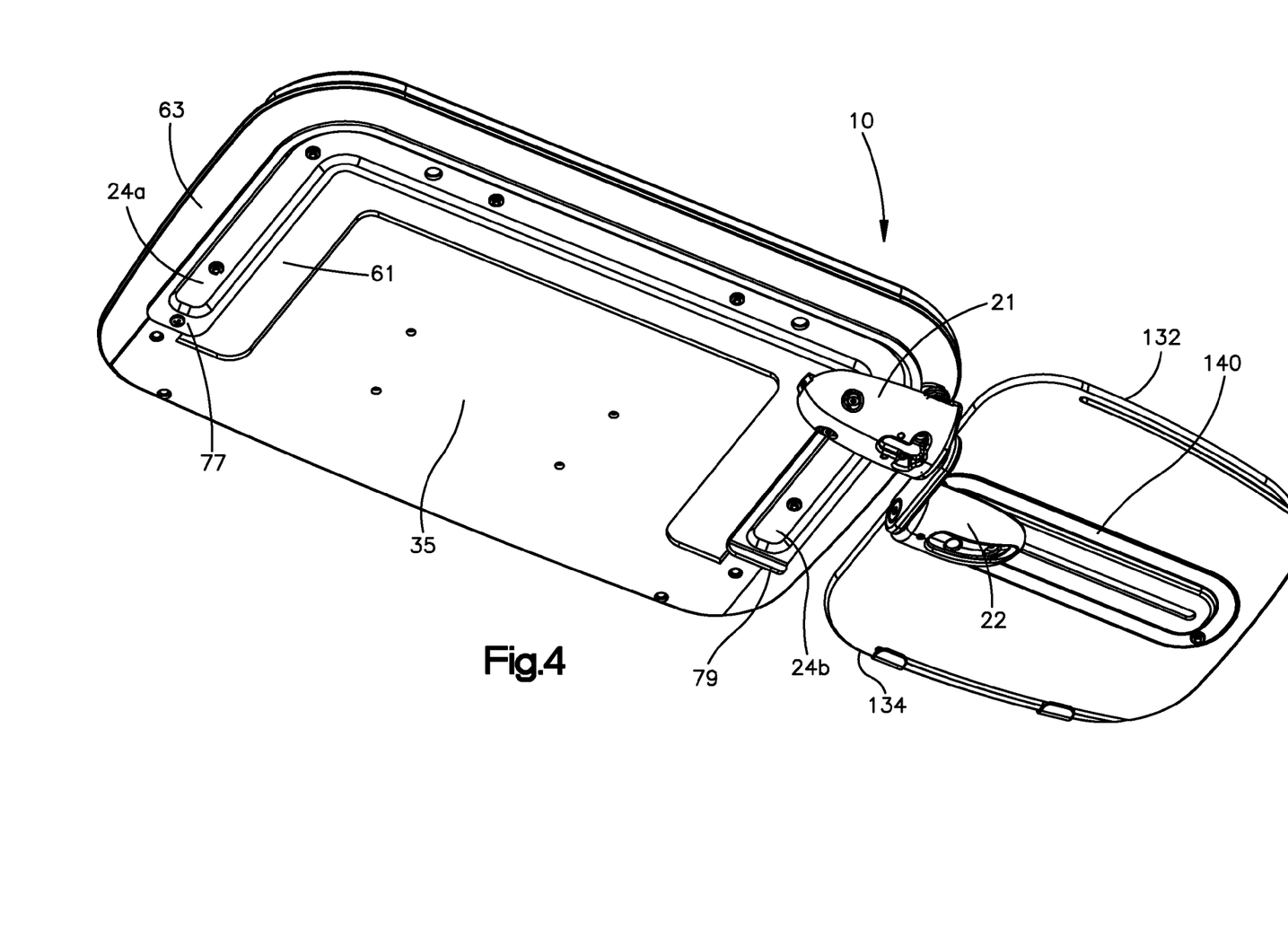
FIG. 4 is a perspective view of the keyboard and mouse supports from below.

A detailed depiction of an engagement between the coupler 21 and the track 24 is shown in the section view of FIG. 3A. The connectors 25 extend through the platform and attach a center portion 60 of the track 24 to a downwardly extending boss 62 of the platform 20. As seen in FIG. 4, the boss 62 and track 24 are bounded along the extent of the track by platform cutouts 61, 63 along either side of the boss. Inner and outer rails 64, 66 of the track have top supporting surfaces 70, 72 and outwardly extending edges 74, 76 for moveably supporting the coupler 21. During assembly of the keyboard support 10 the coupler 21 is slipped over one end 24a of the track 24 and then a threaded connector 77 is threaded into an opening of the track to prevent the follower from moving off the end 24a of the track. At an opposite end 24b of the track, the track includes a permanent abutment 79 which the coupler 21 engages during movement along its U shaped travel path with respect to the keyboard support.

The coupler 21 includes inner and outer metal hangers 80, 81 (FIG. 7) that are supported by the track and position a trolley or follower body 82 beneath the track for movement along the track. As described in more detail below, as a user grasps the mouse support 12 and moves the mouse support with respect to the keyboard support, the coupler 21 slides along the track.

Figure 7:
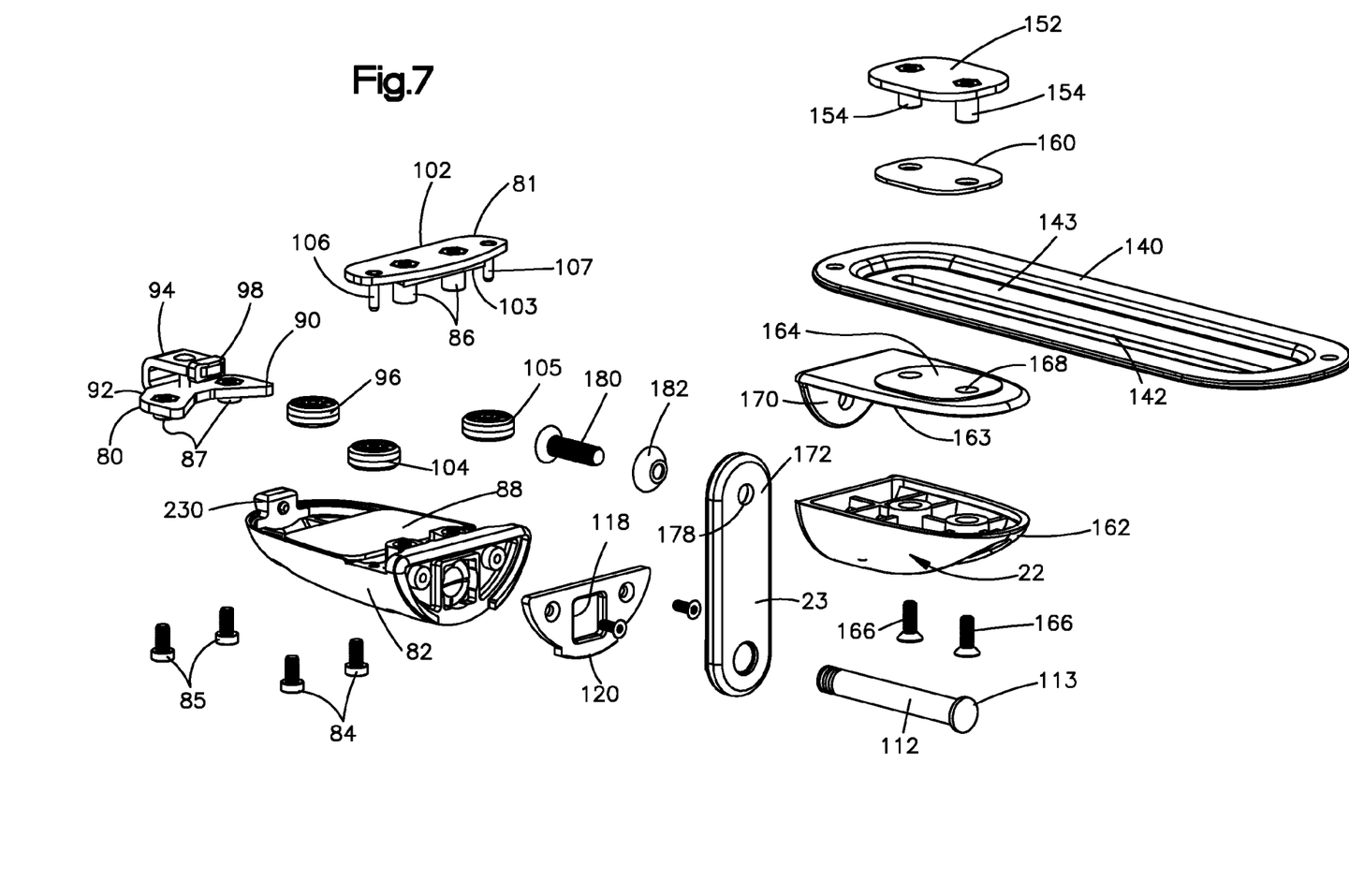
FIG. 7 is an exploded perspective view of the track follower mechanism that moves around a track attached to the keyboard support.

The hangers are attached to the trolley 82 by two pairs of connectors 84, 85 which pass through the follower body and engage threaded openings in the hangers 80, 81 during assembly of the follower mechanism 36. As seen in FIG. 7, the outer hanger 81 has two threaded bosses 86 and the inner hanger 80 has two threaded bosses 87 into which respective pairs of connectors 84, 85 extend. A glide member 88 has an upper bearing surface that engages exposed downwardly facing surfaces of the inner and outer rails 64, 66 to provide a low friction engagement as the coupler 21 is moved along a path of travel as the mouse support 12 is repositioned.

The inner hanger 80 has two lobes 90, 92 that support the threaded bosses 87. As seen in the section view of FIG. 3A, the glide member 88 rests against upwardly facing surfaces of the lobes. The lobes meet at a center of the hanger and extend to a U shaped hanger body 94 that extends around an insider surface 74 of the track. A center portion 95 of the body 94 overlies the track. The body 94 also rotatably supports a roller 96 and a bearing 98. The roller 96 is supported by an axle 99 carried by the hanger 80 which extends through a center opening of the roller and allows the roller to rotate as an outer surface 101 of the roller engages an edge surface 74 of the track as the follower is repositioned with respect to the keyboard support.

The bearing 98 is constructed from a rigid polymer and is biased into engagement with an inside surface of the track by the hanger 80. A center prong of the hanger includes an opening into which a detent 98a of the bearing extends.

The outer hanger 81 has an elongated edge 102 that overlies the outer surface 72 of the track closest to the mouse support. The hanger rotatably supports two additional rollers 104, 105 for rotation. The rollers 96, 104, 105 are plastic and have radially extending spokes which couple inner hubs with outer rims and define cored out regions or wells which extend into a body of the rollers to control shrinkage as the plastic cools to maintain a consistent shape. The rollers rotate about generally vertical axes. Outer surfaces of the rollers contact the inwardly facing and outwardly facing surfaces 74, 76 of the rails. The hanger 81 is constructed from two generally planar thin sheets 102, 103, which are bonded together. A top sheet 102 is metal and the threaded bosses 86 and two pins 106, 107 which form axles for the rollers 104, 105 are press fit into this metal sheet. The bottom sheet 103 is plastic and has cutouts to accommodate a position of the rollers whose top surfaces extend up to engage a bottom surface of the sheet 102.

As depicted in FIG. 3A two sleeve bearings 110, 111 (preferably constructed of nylon) support a rotating shaft 112 having a distal end which attaches to the swing arm 23. As the shaft 112 rotates, the swing arm rotates about a generally horizontal axis 114 with respect to the track follower 36. The swing arm 23 has a square shaped boss 116 that fits or seats within a square recess 118 (FIG. 7) of a cover 120 that mates with the follower body 82. This arrangement allows the swing arm to be rotated to one of four positions. In FIG. 3A the swing arm has been pulled (in the positive x direction) against the action of a spring 122 which holds the boss 116 seated within the recess 118.

Figure 5:
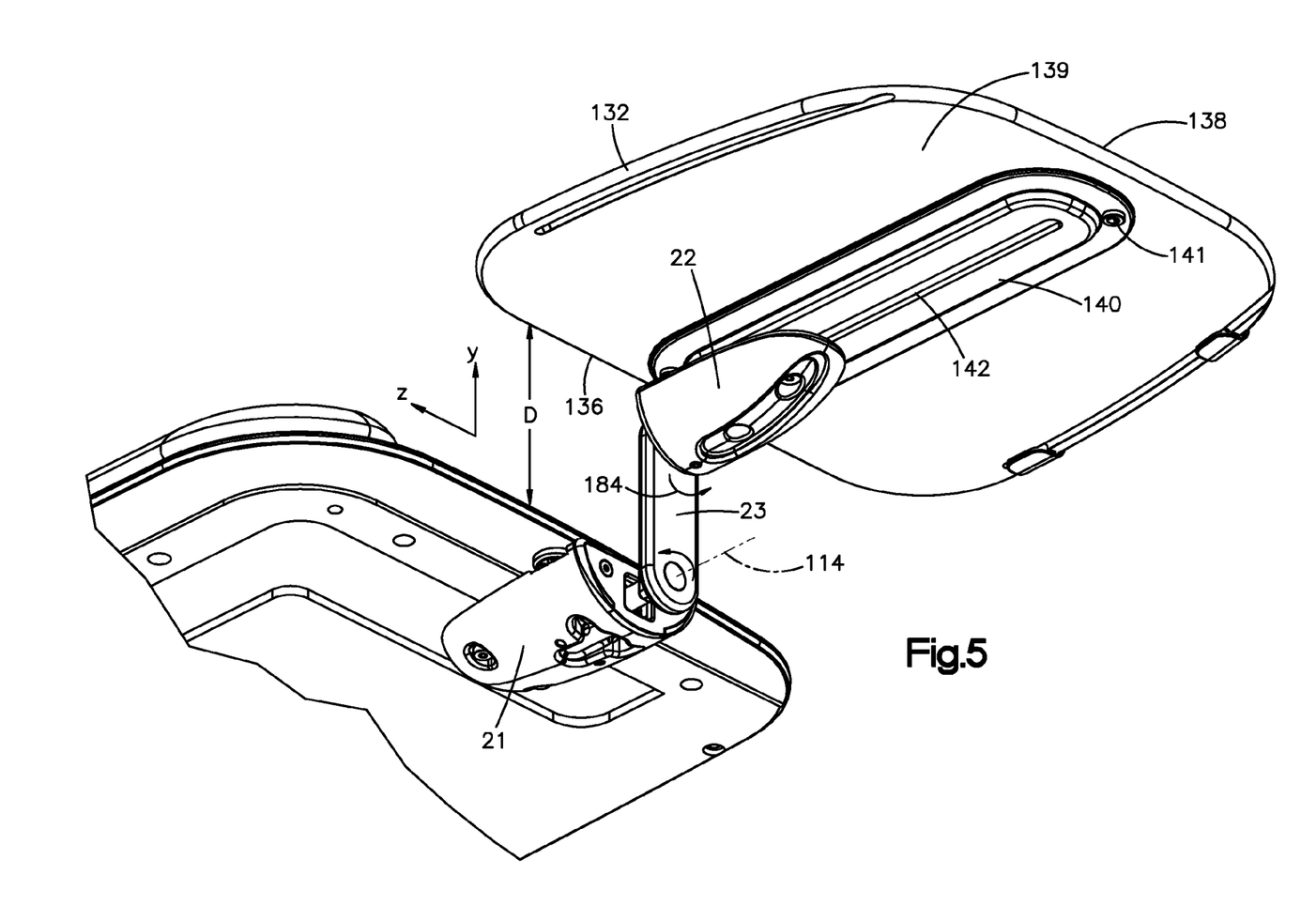
FIG. 5 is an alternate perspective view of the keyboard and mouse supports from below.

The spring 122 is trapped between a split metal ring 124 that fits in a slot of the shaft 112 and a shoulder 126 of the sleeve bearing 110. As a user pulls on the swing arm 23, the spring is compressed against the shoulder 126, tending to return the boss 116 to its seated position within the recess 118. FIG. 5 illustrates the arm 23 pulled away from the follower 36 to allow it to be rotated about the axis 114. When the four sided boss 116 is re-oriented by 90 degrees, it will seat again within the cover 120 due to a restoring force acting on the shaft by the spring 122.

In the FIG. 3A depiction, the swing arm 23 is oriented horizontally with the level of the mouse support platform surface 32 generally at the same the level of the keyboard support platform surface. From the orientation of FIG. 1, the mouse support surface 32 can be raised or lowered to a level wherein a separation distance D (in one embodiment about two inches, but can vary based on a thickness of the keyboard) is achieved between the keyboard support surface and the surface 32. This is achieved by rotating the arm 23 about the axis 114 and then allowing the boss 116 to reseat into its recess 118 to fix the orientation of the arm 23. In the exemplary embodiment, the arm 23 has a total length of about 3 inches. The boss 116 is generally square shaped so there are four different orientations of the arm. The invention certainly contemplates other shaped bosses, however so that for example a six-sided boss would allow more control over the different relative heights of the mouse support and the keyboard support.

The mouse platform 30 is generally symmetric about an x axis (FIG. 1) extending through a centerline of the platform. When the platform 30 is moved to the left hand side of the keyboard support, the mouse support therefore presents the same generally appearance to the user. In the illustrated exemplary embodiment the mouse platform 30 is slightly wider at a region of closest approach to the keyboard platform 20 and tapers or narrows slightly at its outermost or distal region furthest from the keyboard platform 20. If the mouse platform is moved along the track to a position in front of the keyboard platform edge 44 and the wrist pad 40 (See FIG. 6), the platform's narrow distal region remains furthest from the keyboard but in a position where some users find most comfortable for both keyboard and mouse interaction.

Figure 3B:
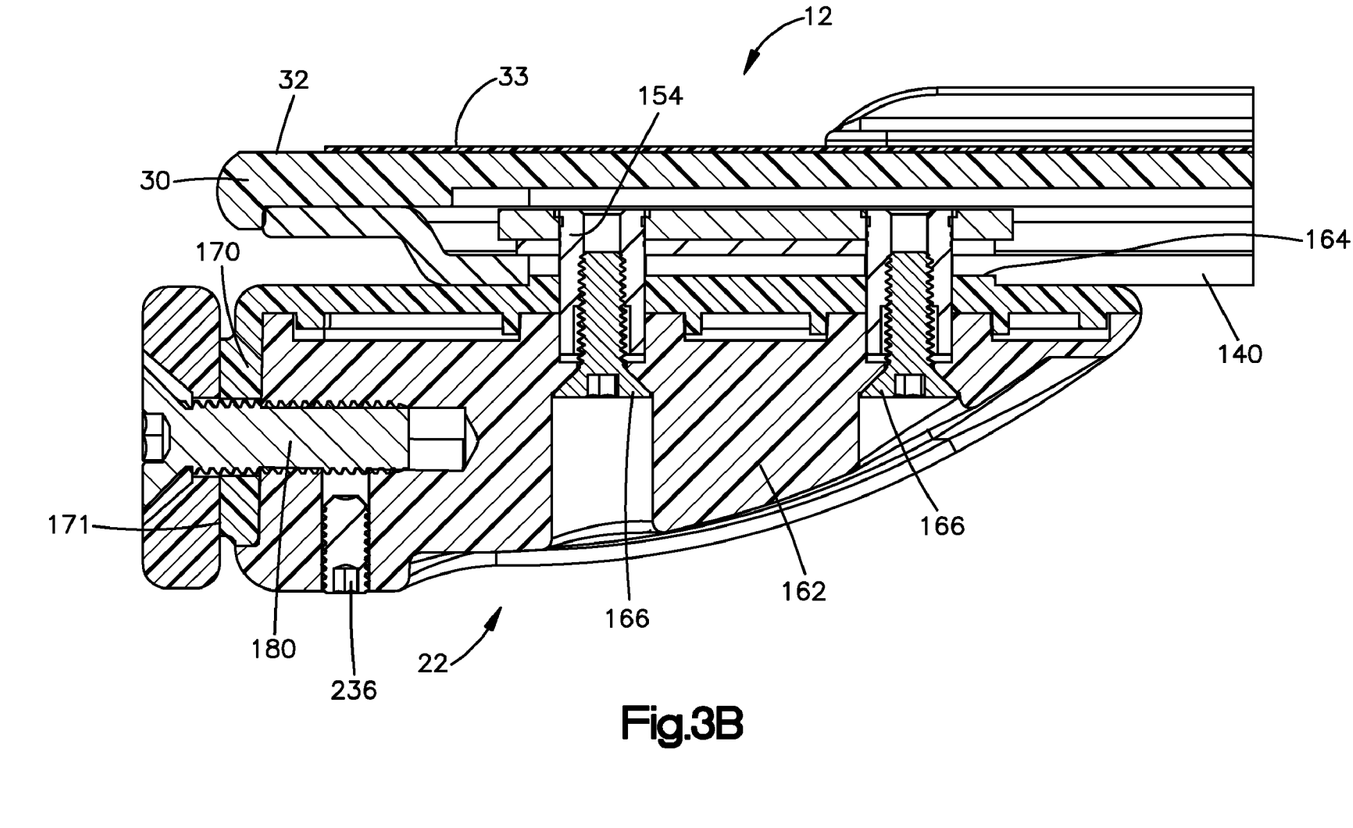

FIG. 3B is a section view showing the mouse support platform 30 defining the generally flat mouse supporting surface 32. One aspect of the exemplary mouse support platform is an ability by the user to slide the platform back and forth along a generally linear travel path (+/−x direction as defined in FIG. 1) to position the mouse support 12 over a region of a keyboard including a pattern 115 of numbers to the right of the alphabetic character keys at the center of the keyboard. This mouse support position is achieved by pulling on the arm 23 and rotating the shaft 112 about the axis 114 so that the arm 23 extends vertically (FIG. 5) so that the flat surface of the mouse support is higher (in the y direction defined in the drawing of FIG. 5) than the keyboard support. The user then slides the platform 30 into position above the keyboard.

The mouse support platform 30 has front and back tapering edges 132, 134 connected by inner and outer side edges 136, 138 and has a bottom surface 139. A mouse support track 140 is coupled to a bottom surface 139 of the platform (with suitable connectors 141) and defines a slot 142 extending through the support track 140. The track 140 has a circumferential lip that contacts the platform and a raised portion that defines the slot.

A mouse coupler 22 has a trolley body 162 that is pivotally coupled to the arm 23 which is turn is coupled for movement with respect to the keyboard as the coupler 21 moves along the track 24. A support plate 152 bears against a generally planar surface 143 of the track that bounds the slot 142. Bosses 154 attached to the plate 152 extend downward through the slot 142 in the track and couple the plate 152 to the trolley 150. A position of the mouse support 30 relative the keyboard support body 20 is adjusted by pushing the mouse support 30 back and forth along a path of travel that parallels a direction defined by the slot 142 (±x direction as that direction is defined in FIG. 3B).

A glide 160 is trapped between the plate 152 and the track 140 and provides a low friction contact between the plate and track allowing the platform (and attached track) to slide back and forth with respect to the coupler 22. In the exemplary embodiment, the glide 160 is constructed of Delrin® which is an polyacetal known generically as POM. An alternate version of the glides 88, 160 used with the exemplary design uses a Teflon filled polymer to make the glides even more lubricious.

The coupler 22 includes a body or trolley 162, cover 163 having an integral glide surface 164 and fasteners 166 for attaching the trolley to the plate 152 above the track. The cover 163 includes openings 168 which fit over the bosses of the plate and position the body with respect to the track. The cover 163 includes a bracket or boss 170 at one end having an outer surface which faces away from the trolley and engages a flat surface 172 of the racetrack shaped arm 23. An opening 178 in the arm accommodates a countersunk bolt or pivot screw 180 that passes through a bushing 182 (made of a rigid polymer) and the opening 178 and connects the swing arm 23 to the glide boss 170 for pivoting movement (See arrow 184, FIG. 5) of the trolley 150 about an axis that coincides with the opening 178.

In accordance with an exemplary embodiment of the invention, the keyboard platform 20 and the mouse platform 32 are machined composite plastic (paper based phenolic) members, preferably about ¼ inch thick. The paper base material is impregnated with phenolic resin and then cured to make the supports rigid. Those skilled in the art will recognize that the keyboard support and mouse support may be suitably fabricated of various other materials including wood, fiberboard, plastics such as polypropylene and ABS, sheet molded materials, etc. Edges of the supports are exposed to contact by the user. As seen in the Figures, the supports have rounded or contoured edges respectively that extend around an outer periphery of those members.

Advantageously, the mouse platform 30 includes the upwardly protruding elongated mouse capture wall 200 that extends along a back or rear edge of the mouse support 30. This wall can be detached and attached to a front surface (now rear) when the mouse support is moved to the left hand side of the keyboard platform. A wrist rest for the mouse is optionally mounted to the front of the mouse support and can be removed and/or re-oriented based on the position and orientation of the support.

The engagement between the tracks 24, 140 and the trolleys to which they are coupled is such that the mouse platform can be easily moved along the tracks but not so easily that the mouse platform would move during normal mouse control movements by the user. Similarly, the engagement of the arm 23 with the trolleys is such that the mouse support can be re-oriented without use of tools. All adjustments are to be made when the combination is assembled so the user need not be concerned with tightening or loosening the fasteners between movable components.

The connectors 84, 85 that attach the hangers to the trolley and maintain engagement between the glide members 88 are Patch lok® connectors commercially available from McMaster Carr.com. As they are tightened in their engagement with corresponding threaded openings in the trolley, the nylon material of the connectors softens or melts into the threads of the openings with which they engage to make loosening of the engagement due to vibration and handling by the user less likely. The fasteners 166 that maintain a pressure of engagement between the glide 160 and the metal track 140 are also patch lok connectors, which thread into the bosses 154 attached to the plate 152.

The exemplary tracks 140, 24 are fabricated from steel and are coated with a black oxide plating on the track surface to enhance their appearance. Alternately, they could be treated with a powder coat. The bolt 180 allows the mouse platform to pivot so that for example, as the mouse support is rotated about the axis defined by the shaft 112 to one of four orientations, the user can reorient the mouse platform. The bolt 180 seats in a cone shaped delrin bushing 182 shown in FIG. 7, which compresses as the bolt is tightened and then a set screw 236 that passes through the body of the mouse trolley is tightened so that the end of the set screw presses tightly against the threads of the bolt 180.

Figure 8:
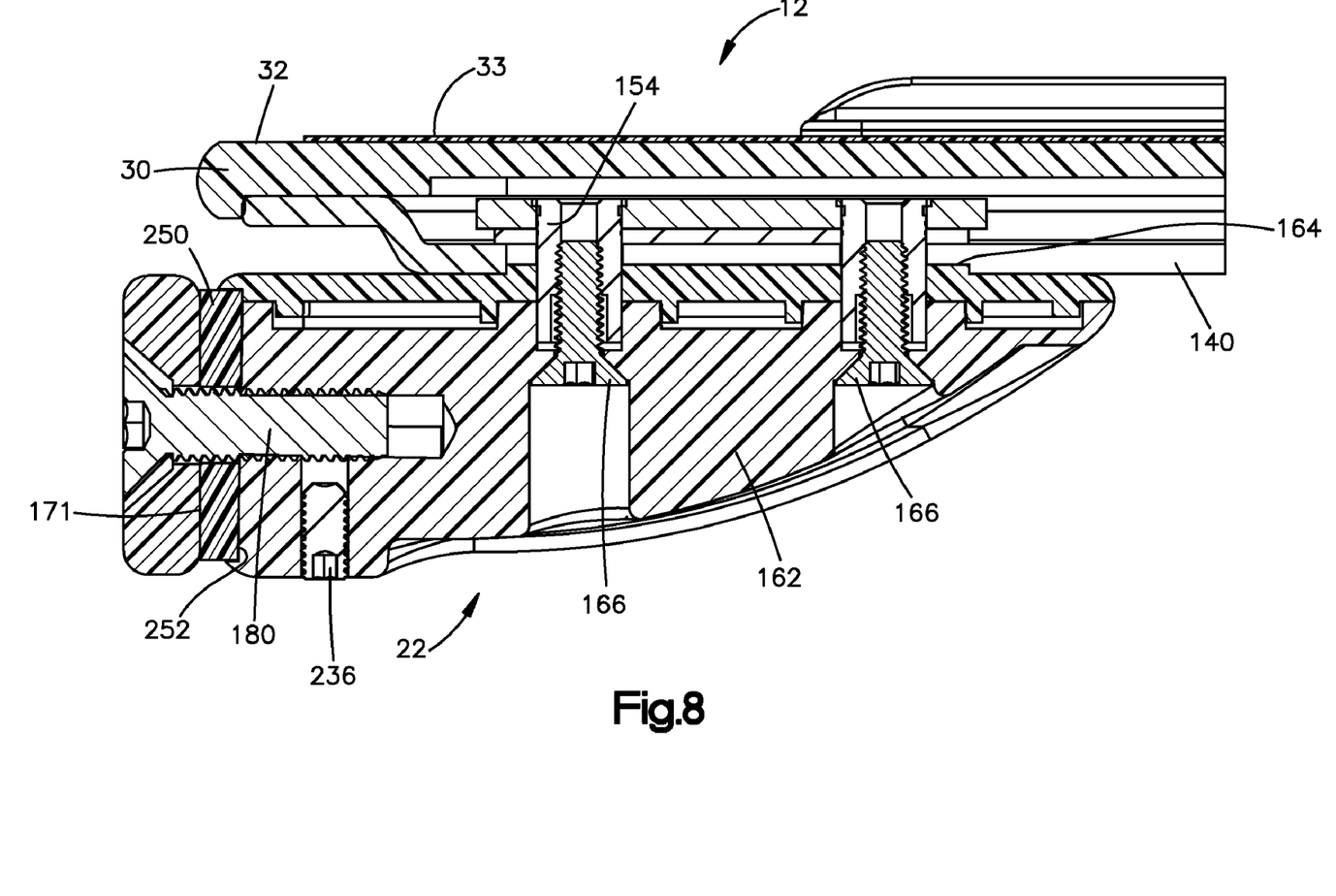
FIGS. 8 and 9 are views depicting an alternate engagement between a mouse trolley and a swing arm.
Figure 9:
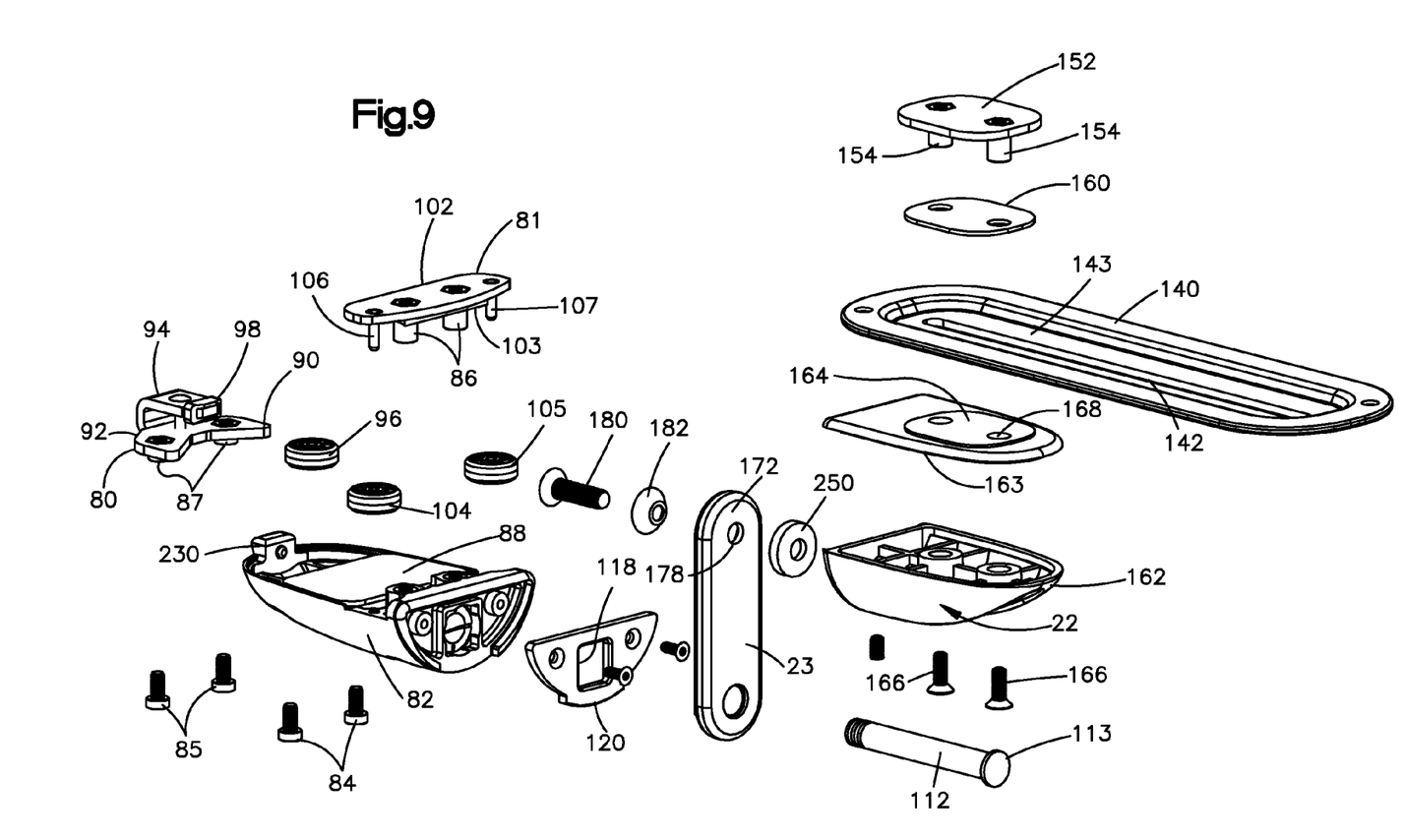

FIGS. 8 and 9 depict an alternate engagement between the arm 23 and the trolley 162. In order to create and maintain the optimal amount of frictional engagement between the swing arm 23 and the coupler 22, and to transmit the necessary stabilizing forces directly from the arm 23 to the mouse support body or trolley 162 without torsionally de-stabilizing the pivot screw 180, a special braking washer 250 is fitted between the arm 23 and the mating face 252 of the mouse support trolley 162, concentric with the pivot screw 180 and adhered to the mouse support trolley by means of adhesive material. The braking washer 250 is constructed of a very stable, wear-resistant friction material having specific properties combining a high dynamic coefficient of friction with a somewhat lower static coefficient of friction. This combination of properties allows the user to smoothly tilt the mouse platform to the optimal position without "stick-slip" behavior, while maintaining very stable position when the user is using the mouse and does not want the mouse support platform to move, and allows the forces required for adjustment of the orientation of the mouse support platform to remain relatively constant over time and many cycles of use without any adjustment or tightening required by the user.

The Brake Washer material is commercially available as GL181-148 produced by Great Lakes FrictionProducts, Inc. Actual composition is proprietary to Great Lakes Friction Products, but in general it is a composite of mineral fiber, what is known in the trade as "chunk rubber" and brass filings, among other things, in a resin binder. The arm 23 is die-cast Zinc, with a black chrome plating. The Trolley body face is die-cast Zinc, with an "e-coat" coating, similar to paint. Inasmuch as the brake washer is glued to the trolley body (using "Black Max" cyanoacrylate pressure-cure adhesive), the main property of importance for the trolley body is the surface 252 be flat, orthogonal to the axis of the pivot screw bore, and that the adhesive adhere to it reliably—friction does not come into play here. By design, the only friction interplay occurs between the black chrome surface 171 of the swing arm and the mating surface of the friction washer 250.

The set screw in combination with a thread locking compound applied to the threads of the bolt 180 avoids a need for user adjustment of the engagement between the arm 23 and the trolley and hence maintains the correct amount of frictional engagement between the arm 23 and the trolley, allowing rotational if a sufficient torque is applied by the user to overcome the frictional engagement between the bolt and the bushing.

The extent of movement of the follower is defined by the track 24. To prevent the follower from falling off the end of the track, the stop 79 is located at one end of the track. The follower butts up against this stop when the follower reaches the end of travel. The two trolleys are plastic and the hangers 80, 81 are die cast zinc and/or aluminum alloy metal.

Figure 6A:
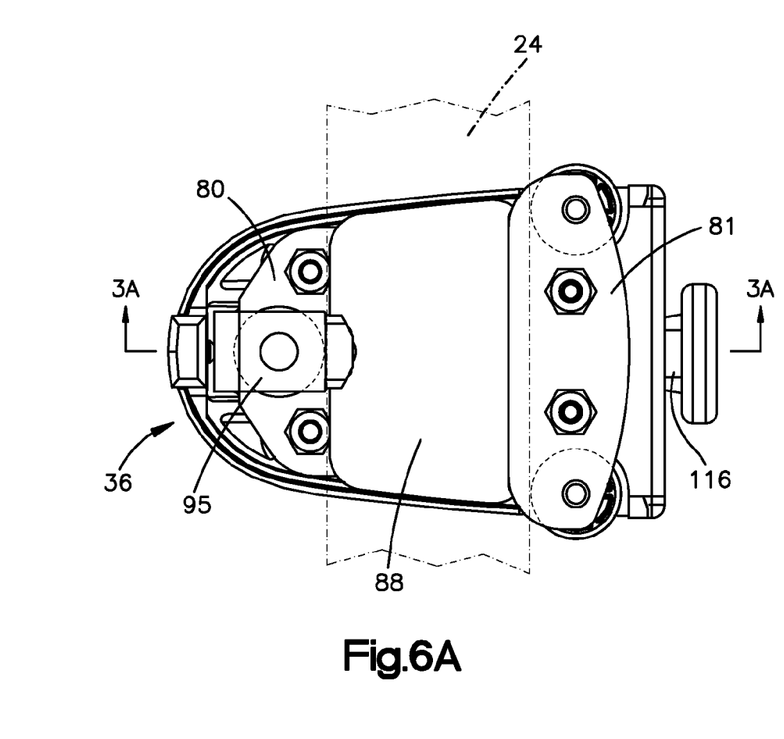
FIG. 6A is an enlarged plan view of a track follower that couples the keyboard support to the mouse support.
Figure 6B:
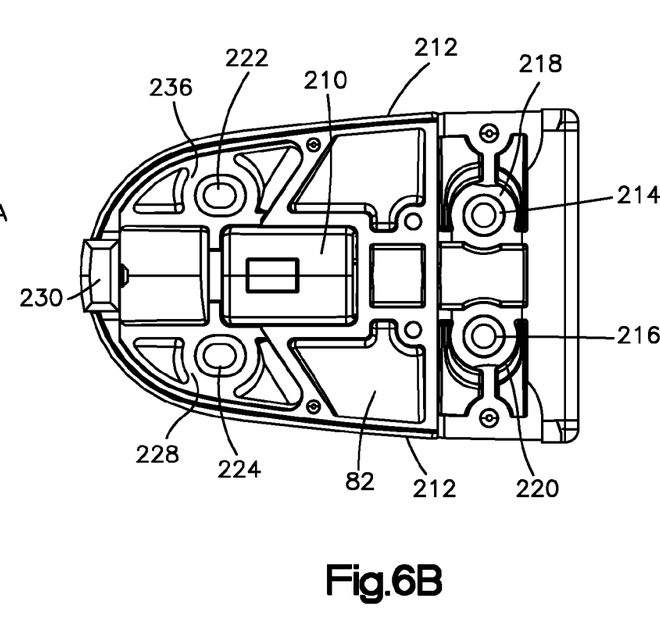
FIG. 6B is a plan view of the track follower of FIG. 6A with hangers and a glide plate removed.

Turning to FIG. 6B, one sees an internal configuration of the trolley body 82. The plastic body defines a number of ribs and columns as well as an interior region or space 210 occupied by an end of the shaft supporting the spring 122. Around the periphery of the body 82 is a lip or ledge 212 sized to border an outer perimeter of the glide 88 when the glide rests on the body 82 (FIG. 6A). Round openings 214, 216 extend through columns 218, 220 and accommodate the connectors 84 which secure the hanger 81 to the body 82.

Oval shaped slots or openings 222, 224 extend through columns 226, 228 at an end of the body 82 spaced from the openings 214, 216. The connectors 85 extend through these openings 222, 224 to connect to the hanger 80. As seen in FIG. 3A, a post 230 at one end of the body 82 has a threaded opening for a set screw that can be adjusted to contact an outer surface of the U shaped hanger body 94. During assembly, the follower is slipped over the track and the position of the hanger is adjusted so that the bumper contacts the track along an angled surface which extends between the rail 64 and the center portion 60 of the track. The inclination of the bumper is roughly the same as the inclination of the track in this region. A fine tuning of the engagement of the roller 96 and bumper is achieved by adjusting the set screw 234.

While the present invention has been described with a degree of particularity, it is the intent that the invention include all modifications and alterations from the disclosed design falling with the spirit or scope of the appended claims.

We claim

1. Apparatus comprising:
   a) a keyboard support having a generally flat keyboard supporting surface that includes a forward edge and two sides which extend away from the forward edge at generally right angles to said forward edge;
   b) a first track extending along an outer periphery of said keyboard support generally parallel to the forward edge and curves around corners of the keyboard support to extend along the two sides;
   c) a mouse support having a generally flat mouse supporting surface;
   d) a track follower coupled to the first track for movement along said first track to allow the mouse support to be re-positioned with respect to the keyboard support in front of or on either side of the keyboard support depending on a user preference; and e) a coupling that supports the mouse support and that pivotally engages the track follower to allow the generally flat mouse supporting surface to be repositioned with respect to the generally flat keyboard supporting surface.

2. Apparatus for coupling a keyboard support having a generally flat keyboard supporting surface to a mouse support having a generally flat mouse supporting surface comprising:
   a) a keyboard coupler connected to the keyboard support extending beneath the flat keyboard supporting surface;
   b) a mouse coupler connected to the mouse support extending beneath the flat mouse supporting surface; and
   c) a swing arm that pivotally engages the mouse coupler and the keyboard coupler to allow the generally flat mouse supporting surface of the mouse support to be repositioned and re-oriented as the swing arm is reoriented;
   d) said swing arm comprising a shaft supported by said keyboard coupler having a multisided boss at one end of said shaft that fits in a correspondingly configured recess of a body of the keyboard coupler to fix an orientation of the swing arm in a finite number of stable orientations wherein at least one stable orientation of the swing arm positions the mouse support surface above the keyboard supporting surface and wherein at least one additional stable orientation of the coupling arm positions the mouse support surface below the keyboard supporting surface.

3. The apparatus of claim 2 wherein the mouse coupler comprises a generally flat exposed surface and the swing arm has a conforming generally flat surface biased against the flat exposed surface of the mouse coupler to maintain a relative orientation of the mouse platform while allowing adjustment of said relative orientation.

4. Apparatus comprising:
   a) a keyboard support having a generally flat keyboard supporting surface bound by a forward edge and two side edges which extend away from the forward edge at generally right angles to said forward edge;
   b) a curved track attached to an underside of said keyboard support wherein the curved track extends generally parallel to the forward edge and curves around corners of the keyboard support to extend along the two side edges of said keyboard support and has a center portion which contacts the keyboard support coupled to inner and outer rails spaced from the underside of the keyboard support;
   c) a mouse platform defining a generally flat mouse supporting surface on one side and including an elongated track coupled to an underside of said mouse platform having an elongated lip that engages the mouse platform and a spaced portion bounding an elongated slot extending through a center portion of the elongated track;
   d) a mouse platform support assembly comprising:
      i) a mouse trolley coupled to the elongated track for back and forth movement with respect to the elongated track along a path defined by the elongated slot in said elongated track;
      ii) a slide engaging the elongated track that bears against the spaced portion of the track for facilitating relative movement between the mouse support trolley and the elongated track; and
      iii) connectors that maintain a force of engagement between the slide and the tract coupled to the trolley;
   e) a track follower slideably coupled to the curved track for movement along said curved track to allow the mouse platform to be re-positioned with respect to the keyboard support comprising:
      i) hangers which engages the inner and outer rails of the curved track along flat supporting surfaces of said rails that face an underside of said keyboard support;
      ii) a follower trolley which is attached to the hangers and extends downwardly from said curved track for movement by a user along the curved track;
      iii) at least one inner roller supported by a combination of a hanger and the follower trolley for rotation about a first axis and positioned having an outer edge of said roller that contacts an inner surface of the rail; and
      iv) at least one outer roller supported by a combination of a hanger and the follower trolley for rotation about an additional axis spaced from said first axis and positioned having an outer edge of said outer roller that contacts an elongated outer surface of the rail; and
   f) an elongated coupling arm that pivotally engages the mouse and follower trolleys at opposite ends of the elongated arm for allowing the generally flat mouse supporting surface to be re-oriented with respect to the generally flat keyboard support surface.

5. The apparatus of claim 4 wherein the track follower additionally comprises a sleeve bearing supporting the coupling mounted to said follower trolley and a shaft coupled to the elongated coupling arm to allow relative rotation of the coupling arm with respect to the track follower.

6. The apparatus of claim 5 wherein the elongated coupling arm includes a multi-sided boss at one end that fits into a correspondingly configured opening in the follower trolley define stable orientations of the elongated coupling arm.

7. The apparatus of claim 6 wherein the shaft is biased into the body of the follower trolley by a spring carried by the follower trolley.

8. Apparatus comprising:
   a) a keyboard support having a generally flat keyboard supporting surface;
   b) a track extending along an outer periphery of said keyboard support;
   c) a mouse support having a generally flat mouse supporting surface;
   d) a track follower coupled to the track for movement along said track for allowing the mouse support to be re-positioned with respect to the keyboard support; and
   e) a coupling arm that connects the track follower and the mouse support and includes a shaft that is pivotally supported by the track follower to allow the generally flat mouse supporting surface to be re-positioned with respect to the generally flat keyboard supporting surface;
   f) said shaft including a multisided boss that fits in a correspondingly configured recess of the track follower in a finite number of stable orientations wherein at least one stable orientation of the coupling arm positions the mouse support surface above the keyboard supporting surface and wherein at least one additional stable orientation of the coupling positions the mouse support surface below the keyboard supporting surface.

9. Apparatus comprising:
   a) a keyboard support having a generally flat keyboard supporting surface that includes a forward edge and two sides which extend away from the forward edge;
   b) a rail that is attached to an underside of the keyboard support having inner and outer flanges and extending along an outer periphery of said keyboard support along at least a first rail portion near the forward edge coupled to a curved rail portion which extends to an additional rail portion extending along at least one side of the keyboard support;

c) a mouse support having a generally flat mouse supporting surface;

d) a follower having a plurality of rollers that engage the inner and outer flanges of the rail for movement along said rail as the follower moves with respect to the keyboard support to allow the mouse support to be re-positioned with respect to the keyboard support; and e) a coupling that supports the mouse support and that pivotally engages the follower to allow the generally flat mouse supporting surface to be re-positioned with respect to the generally flat keyboard supporting surface.

10. The apparatus of claim 9 wherein the rail has inner and outer elongated spaced apart surfaces which guide the track follower and wherein the track follower comprises:

a) a hanger portion which engages the rail along a flat supporting surfaces of said rail which face an underside of said keyboard support;

b) a trolley portion which is attached to the hanger portion and extends downwardly from said rail;

c) at least one inner roller supported by a combination of the hanger and the trolley for rotation about a first axis and positioned having an outer edge of said roller that contacts an inner surface of the rail;

d) at least one outer roller supported by a combination of the hanger and the trolley for rotation about an additional axis spaced from said first axis and positioned having an outer edge of said outer roller that contacts an elongated outer surface of the rail; and e) a sleeve bearing supporting the coupling mounted to said trolley portion to allow relative rotation of the coupling with respect to the track follower.

11. The apparatus of claim 10 wherein the coupling comprises a shaft mounted to the sleeve bearing of said trolley having one end which extends outward beyond the trolley portion and further comprises an elongated swing arm connected to the one end of the shaft and which supports the mouse support.

12. The apparatus of claim 10 wherein the hanger portion includes lubricious bearing surfaces which engage the elongated track during moving of the mouse support with respect to the keyboard support.

13. Apparatus comprising:

a) a keyboard support having a generally flat keyboard supporting surface that includes a forward edge and two sides which extend away from the forward edge;

b) a track extending along an outer periphery of said keyboard support along at least a first track portion near the forward edge coupled to a curved track portion which extends to an additional track portion extending along at least one side of the keyboard support;

c) a mouse support having a generally flat mouse supporting surface;

d) a track follower coupled to the track for movement along said track to allow the mouse support to be re-positioned with respect to the keyboard support;

e) a shaft that is rotatably supported by the track follower that, at one end, extends into a body of the track follower and which, at a second end, extends beyond the keyboard support; and f) a swing arm attached at or near the second end of the shaft for rotation with the shaft that is coupled to the mouse support for allowing the generally flat mouse supporting surface to be re-positioned with respect to the generally flat keyboard supporting surface.

14. The apparatus of claim 13 wherein the mouse support comprises a mouse platform and a coupler having a generally flat exposed surface and the swing arm has a conforming generally flat surface biased against the flat exposed surface of the coupler to maintain a relative orientation of the mouse platform while allowing adjustment of said relative orientation.

15. Apparatus comprising:

a) a keyboard support having a generally flat keyboard supporting surface;

b) a first track extending along an outer periphery of said keyboard support;

c) a mouse support having a generally flat mouse supporting surface;

d) a track follower coupled to the first track for movement along said first track to allow the mouse support to be re-positioned with respect to the keyboard support; and e) a coupling that supports the mouse support and that pivotally engages the track follower to allow the generally flat mouse supporting surface to be re-positioned with respect to the generally flat keyboard supporting surface;

f) said mouse support comprising i. a platform defining the generally flat mouse supporting surface on one side;

ii. a mouse support track coupled to said platform engaging an opposite side of the platform from the mouse supporting surface having a spaced portion including a slot extending through the track;

iii. a mouse support trolley pivotally coupled to the coupling for movement with the track follower;

iv. a slide for bearing against the spaced portion of the mouse support track; and v. plastic connectors coupled to the mouse support trolley that deform as they are tightened to maintain a force of engagement between the slide and the mouse support track.

16. Apparatus comprising:

a) a keyboard support having a generally flat keyboard supporting surface bounded by an edge along a front and sides of said keyboard support;

b) a mouse support having a mouse platform having a generally flat mouse supporting surface;

c) a mouse support coupler having a generally flat exposed surface;

d) an elongated track coupled to the keyboard support that defines a mouse support path of movement along the edge of the keyboard support; said elongated track including a portion coupling the track to the keyboard support and a rail portion spaced from the keyboard support;

e) a hanger that engages the rail portion of the elongated track;

f) a trolley attached to the hanger that extends downwardly from said rail;

g) one or more guide rollers supported by a combination of the hanger and/or the trolley that engage a surface of the rail portion and that rotate as the trolley moves with respect to the keyboard support;

h) a sleeve bearing extending through a body portion of said trolley;

i) a shaft supported by the sleeve bearing for rotation about an axis having one end that extends beyond the edge of the keyboard support;

j) a swing arm supported by said shaft at a region of said one end for coupling the trolley and the mouse support coupler to adjust a height of mouse support with respect to the flat keyboard supporting surface as a user rotates the mouse support about the axis defined by the shaft, said swing arm having a flat surface conforming generally to the exposed surface of the mouse support coupler; and k) a braking washer fit between the flat exposed surface of the coupler and the conforming generally flat surface of the swing arm biased against the flat exposed surface of the mouse support coupler to maintain a relative orientation of the mouse platform while allowing adjustment of said relative orientation.

* * * * *